April 29, 1969   B. E. KING   3,441,735
BOUNDARY FOLLOWER USING OSCILLATING PHOTOCELLS
Filed Oct. 22, 1965
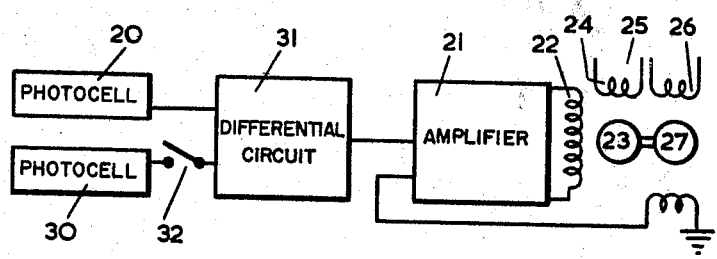
FIG. 1
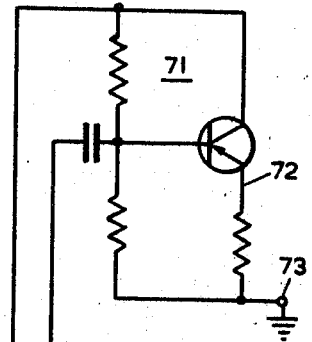
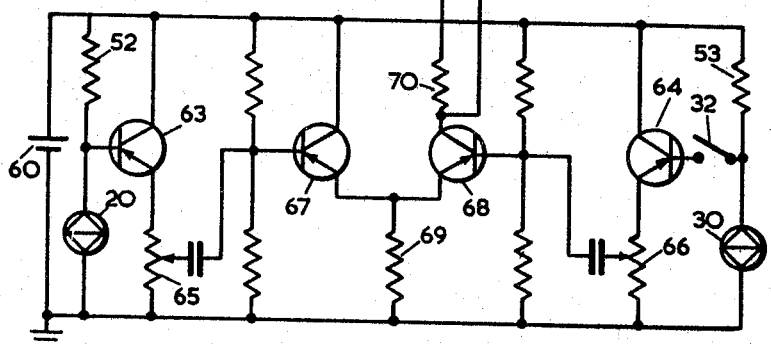
FIG. 2
INVENTOR
BRIAN EDMUND KING
BY Townsend & Townsend
ATTORNEYS

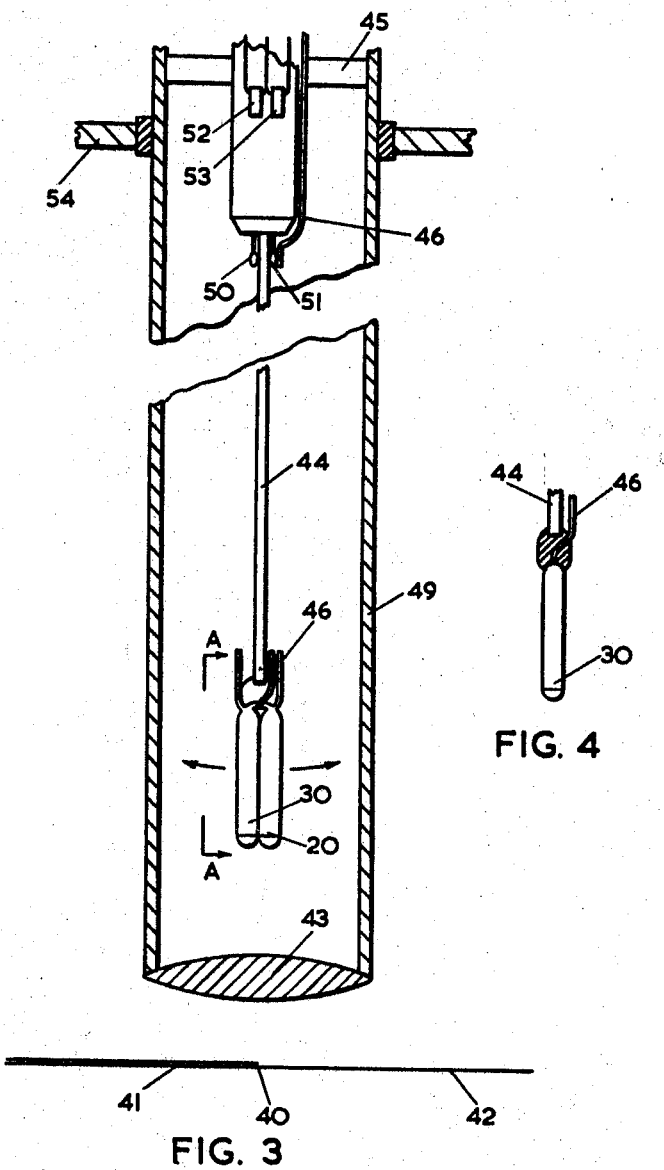

INVENTOR
BRIAN EDMUND KING

United States Patent Office 3,441,735
Patented Apr. 29, 1969

3,441,735
BOUNDARY FOLLOWER USING OSCILLATING PHOTOCELLS
Brian Edmund King, Harrow Weald, England, assignor to The British Oxygen Company Limited, a British company
Filed Oct. 22, 1965, Ser. No. 501,797
Claims priority, application Great Britain, Oct. 28, 1964, 17,648/64
Int. Cl. G05b 1/01, 11/32
U.S. Cl. 250—202   6 Claims

ABSTRACT OF THE DISCLOSURE

A device for tracing or following a boundary between two areas of dissimilar optical reflectivities comprises two photocells oscillated in unison transversely to that portion of the boundary which is aligned with the photocells. The signals from the cells are combined to give a signal used to steer the device back to the boundary when it deviates from it.

---

The present invention relates to a follower for following a boundary between two areas which appear on a record and which absorb light differently.

Line followers are known which follow a line marked on a record and which include a light source for illuminating the line, and a lens for focussing an image of the line onto a light-sensitive device, such as a photocell, which produces an output signal representative of the intensity of the light transmitted to the light-sensitive device. The image and the light-sensitive device are made to oscillate at predetermined frequency, hereafter called the scanning frequency, and normally either 50 or 60 cycles per second, relative to one another causing the sensitive area of the light-sensitive device to cross the image of the line repeatedly and to provide an alternating output signal of twice scanning frequency. Upon a deviation of the follower from the line, the output signal also includes a component of a frequency equal to scanning frequency, and the phase and amplitude of this component relative to a reference respectively represent the direction and degree of deviation.

A filter circuit tuned to scanning frequency is used to select this particular component, and this component is then passed through an amplifier and arranged to energise a steering motor. The steering motor is usually a two-phase servo motor, one of the phase windings being energised by this component when present and the other by a reference current. The arrangement is such that the steering motor is energised when the output signal of the light-sensitive device indicates that the line follower is deviating from the line, and then steers a tracking wheel guiding a carriage for the line follower, or a resolver in the case of a co-ordinate drive machine, back towards the line to cancel the deviation.

It has already been proposed to modify such a line follower for use in following a boundary between two areas appearing on a record, one of the areas being darker than the other. The modification consists of stopping the relative oscillation between the lens image and the light-sensitive device, arranging the light source to pulse at a predetermined frequency, say at 50 cycles per second, and balancing the output signal from the light-sensitive device with a reference signal of the same frequency. A deviation of the follower from the boundary causes the balance between the output signal and reference signal to be upset, and a steering device is arranged to respond to reduce the imbalance by cancelling the deviation.

This modification of the line follower to permit a boundary to be followed has the disadvantage that the balance between the output signal and reference signal is easily upset for example by changes in the brightness of the light source, changes in the contrast between the two areas, changes in the characteristics of the light-sensitive device, and variations in supply voltage.

It is one object of the invention to provide a boundary follower which is less susceptible to unsatisfactory operation as a result of variations in the factors referred to in the foregoing paragraph.

It is another object of the invention to provide a boundary follower which is readily convertible to a line follower.

According to the present invention there is provided a follower for following a boundary between two areas which appear on a record and which absorb light differently, the following comprising a light source for illuminating an area on the record, two light-sensitive devices, a focussing device for focussing an image of the illuminated area onto the light-sensitive devices, each light-sensitive device being arranged to provide an output signal representative of the intensity of the light transmitted thereto, means for causing the light-sensitive devices and the said image to oscillate in relation to one another in such a manner that the light-sensitive devices repeatedly cross a scanning axis, fixed in relation to the said image, the light-sensitive devices moving from one particular side of the scanning axis to the other side at different instants of time, in which the said output signals are combined, and a steering device serving in response to the combined output signal to steer the follower relative to the illuminated area so as to cause the scanning axis to coincide with the said boundary.

In this specification the term scanning axis is used to refer to a line through the midpoint of a scan of the light-sensitive devices and which is disposed approximately in the plane of the image of the illuminated area and extends perpendicularly to the direction of movement in this plane of the light-sensitive devices.

The control device may either add or subtract the outputs from the light-sensitive devices depending upon the relative dispositions of the light-sensitive devices and the relative movement of the light-sensitive devices and the image. Thus if the light-sensitive devices are mounted in line and oscillate along the line joining them, the output signals from the light-sensitive devices can be subtracted to provide a combined signal which alternates at a frequency twice the frequency of oscillation of the light-sensitive devices. The combined signal also has a signal component of a frequency equal to the frequency of oscillation of the light-sensitive devices whenever the boundary to be followed deviates from the scanning axis. The phase of the signal component depends on the direction of deviation.

The boundary follower can readily be converted to a line follower by making one of the light-sensitive devices inoperative or by making the control device insensitive to the output signal from one of the light-sensitive devices.

Various types of photocell may be used for the light-sensitive devices, and a single photocell may be used for both if it has two distinct light-sensitive areas each capable of producing independent output signals in response to light falling thereon.

A boundary follower in accordance with the invention will now be described by way of example with reference to the accompanying drawings, in which:

FIGURE 1 is a block diagram of the main circuit components,

FIGURE 2 is a circuit diagram of the pre-amplifier differential circuit,

Figures 5, 6:
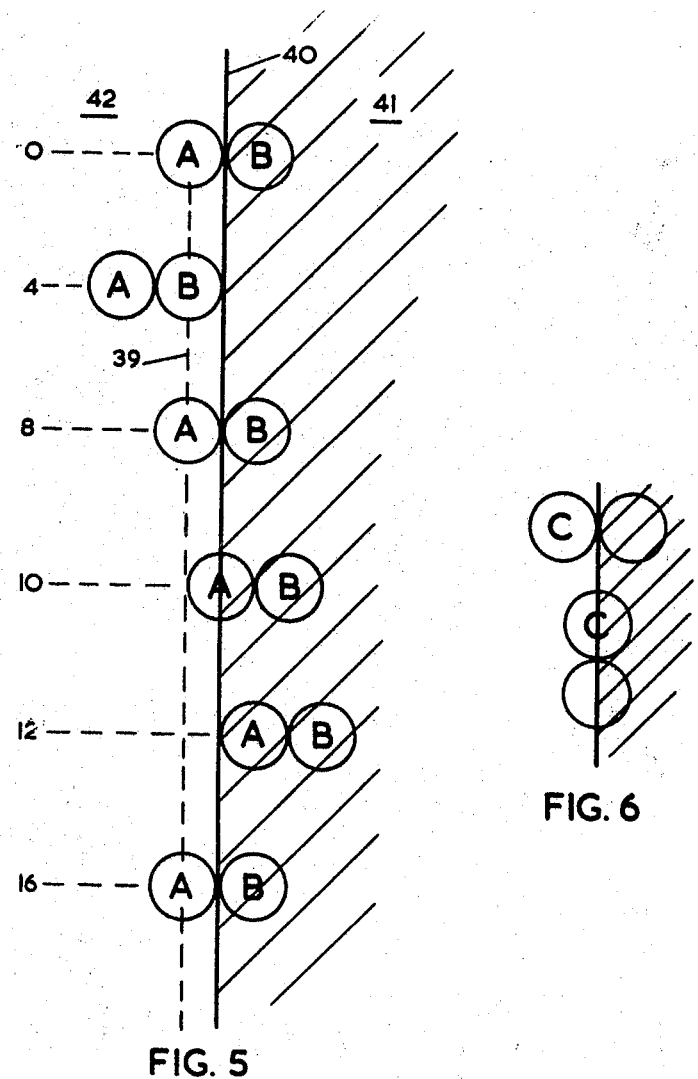
Figure 7:
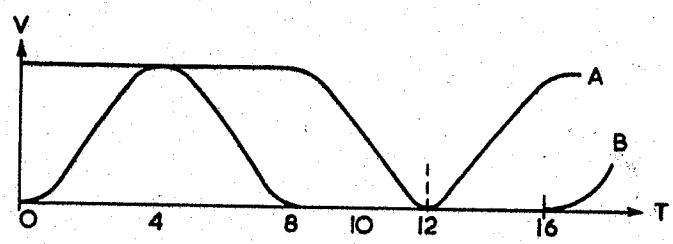
Figure 8:
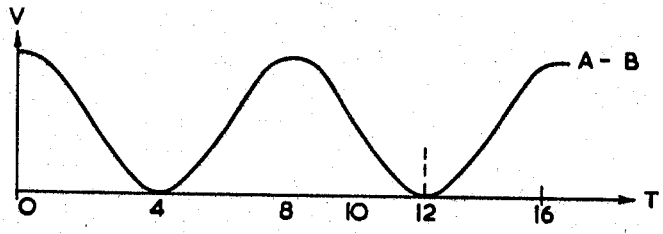
Figure 9:
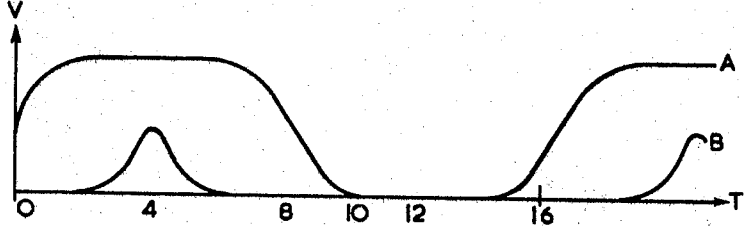
Figure 10:
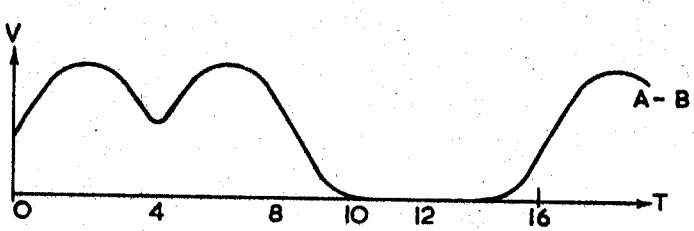

FIGURE 3 is a diagrammatic elevation of part of a scanning head including two photoelectric cells, FIGURE 4 is a section on the line A—A in FIGURE 3, FIGURE 5 is a diagrammatic plan showing the position at successive instants of time during their scanning movement over a boundary of the two photocells shown in FIGURE 3, FIGURE 6 is a diagrammatic plan showing the positions of an alternative pair of photocells executing a rotary scanning movement, FIGURE 7 shows the outpu voltage waveforms produced by the photoelectric cells shown in FIGURE 3 when the scanning axis is centred over the boundary being followed, FIGURE 8 shows the voltage waveforms produced by adding the two waveforms shown in FIGURE 7, FIGURE 9 is similar to FIGURE 7 but shows the output voltage waveforms obtained when the boundary has deviated from the scanning axis, and FIGURE 10 shows the voltage waveform produced by adding the two waveforms shown in FIGURE 9.

Referring to FIGURE 1 of the drawings, the boundary follower is similar to the known type of line follower described above in that the output signal from the photocell 20 of a scanning head is applied to an amplifier 21 including a filter circuit tuned to the scanning frequency of the scanning head. Any output signal component alternating at scanning frequency causes energisation of one phase winding 22 of a two phase servo motor 23 acting as steering motor. The other phase winding 24 is supplied from a reference source 25. The winding 26 of a tachogenerator 27 coupled to the steering motor 23 provides a stabilising negative feedback voltage to winding 22 through amplifier 21 in known manner. Furthermore, the amplifier 21 includes in known manner a safety relay adapted to stop movement of the conventional drive carriage carrying the scanning head and steering head should no photocell signals be received by amplifier 21.

A novel item in this boundary follower is the use of a second photocell 30 in addition to photocell 20, both of these photocells applying their output signals to respective input circuits of a pre-amplifier differential circuit 31, if a switch 32 is in its closed position. As will be described below, the photocells 20 and 30 are positioned with respect to one another so that during scanning of the image they move in turn across the centre line of the scan from one particular side of this centre line to the other and back again.

Different output signals are therefore produced by the two photocells, and these signals are combined in the preamplifier differential circuit. The combined signal passes through a buffer amplifier to the amplifier 21, and any signal component at scanning frequency then causes appropriate energisation of the steering motor, in the usual way.

In this particular boundary follower an oscillating photocell scanning head is used. A scanning head of the oscillating scan type and having a photocell mounted at the lower free end of a piezo-electric crystal rod is described in U.S. Patent 3,246,571. A diagrammatic elevation of part of such a scanning head modified to incorporate two photocells is shown in FIGURE 3. The elevation is taken on a line transverse to a straight boundary 40 dividing a dark area 41 on a record from a light area 42. A lens 43 is arranged to focus an image of the record onto two photocells 20 and 30 which are fixed side by side at the free end of a piezo-electric crystal rod 44 whose other end is fixedly mounted on a scanning head plate 45. Output connections 46, one being a common earth, are taken from photocells 20 and 30. Connections 50 and 51 are also made to the silver plated sides of the piezo-electric rod 44 so that an alternating current can be applied to rod 44. When so energised, the rod 44 moves to left and right as seen in FIGURE 3 at the A.C. supply frequency, this frequency being chosen to be the required scanning frequency. A housing 49 for the lens 43 and oscillating photocells 20 and 30 is supported by a carriage 54 and arranged to be steered in known manner. Also enclosed within the housing 49 are two thermistors 52 and 53 which are connected in series with the photocells 20 and 30.

Reference to FIGURE 4 will show that the piezo-electric crystal rod 44 is thicker transversely of its direction of oscillation, and that the photocells 20 and 30 are positioned one behind the other in the direction of oscillation.

Referring to FIGURE 2, the pre-amplifier differential circuit is energised from a D.C. source 60. The photocells 20 and 30 are each connected in series with the thermistors 52 and 53 across this D.C. source, and the output voltages from the photocells are each applied between the base and emitter of respective transistors 63 and 64. It will be noted that the output voltage from photocell 30 is only applied to transistor 64 when switch 32 is closed, that is when boundary following and not line following is required. The amplified output voltages are capacitively coupled from potentiometers 65 and 66 to the bases of two further transistors 67 and 68 which further amplify the output voltages and apply the further amplified voltages across resistor 69. A combined output voltage that is actually the difference between the amplified output voltages is then taken off from resistor 70 and passed through a buffer amplifier stage 71. The output appears across terminals 72 and 73 and is applied to amplifier 21 seen in FIGURE 1.

In FIGURE 5 the circles marked A and B correspond respectively to photocells 20 and 30, and an image of the boundary 40 is shown separating the dark and light areas 41 and 42 on the record. At an instant 0 the photocells are disposed at opposite sides of the boundary image. Four units of time later, as shown, the scanning head has moved a short distance (down the page) along the boundary and the photocells have moved through a quarter of their scan and are then disposed both to the left hand side of the boundary. After eight units of time the photocells are back at opposite sides of the bounadry but moving from left to right, and the relative positions are also shown after 10 and 12 units and also at 16 units when a complete scanning cycle has been completed.

Reference to FIGURE 7 should now be made to appreciate the instantaneous values of the photocell output voltages at the different positions during the scan. In FIGURES 7, 8, 9 and 10 voltages are shown as ordinates and time units are shown as abscissae. From FIGURE 7 it is therefore apparent for example that with the midpoint of the scan centred over the boundary, as indicated in FIGURE 5, the output voltage of photocell A is at its maximum at instants 0, 4, and 8 whilst light from the light area falls on the whole area of this cell. The output voltage for photocell B is zero at instants 0 and 8, however, because the dark area is then focussed on this cell.

It is the function of the pre-amplifier differential circuit to amplify the photocell output voltages and then to subtract them. The combined output voltage resulting from the waveforms of FIGURE 7 is shown in FIGURE 8, and it will be seen that it follows a sine wave alternating at twice the scanning frequency. As indicated above, the amplifier 21 includes a filter circuit that does not accept this frequency, and no signal would be passed through to the steering motor 23 in response to a scan centred on the boundary as shown in FIGURE 5.

The midpoint of the scan may not be over the boundary but displaced therefrom by a quarter of the amplitude of the scan, as will be evident from FIGURE 5 if the broken line 39 is assumed to be the new boundary. In this event the photocell output voltages are as represented in FIGURE 9, and the combined output voltage is represented in FIGURE 10. This latter voltage includes a component at scanning frequency which is effective to energise the steering motor 23 to steer the scanning head to the left in FIGURE 5 in an attempt to centre the midpoint of the scan over the new boundary 39. The phase of the component at scanning frequency is determined by the direction in which the boundary image deviates from the scanning axis, this phase change being 180° as the boundary image crosses the scanning axis.

The boundary follower as described above will follow a boundary between a dark area on the left hand side of its direction of movement and a light area on the right hand side. Switching means not shown may be provided to interchange the positions of the photocells 20 and 30 in the circuitry in order that the boundary follower can follow a boundary with the dark area on the right hand side. Alternatively, the switching means may reverse the connections to the steering motor 23.

If a line is to be followed instead of a boundary then the switch 32 is opened and normal line follower operation is obtained. It is first necessary, however, to recentre the now displaced scan of the photocell 20. This may be done, for example, by offsetting the optical system transversely of the line through a small distance and alternative datum positions may be provided on a kerf setting device for this purpose. Alternatively a suitable biassing voltage may be applied to the crystal rod 44.

It will be apparent that instead of causing the photocells to oscillate, the image produced by the lens can be made to oscillate in relation to photocells which are fixed to the carriage. The oscillation of the image can be accomplished, for example, by transmitting the image to the photocells by way of an oscillating mirror.

Alternatively, instead of following a linear scan, the photocells can be caused to revolve relative to the image of the illuminated area, their position at two different instants of time being shown in FIGURE 6. It will be seen that in moving from, say, the left hand side to the right hand side of the scanning axis the two photocells cross the scanning axis at different instants of time. If the photocells are positioned diametrically opposite one another relative to their axis of revolution, and a boundary is being followed, the combined output from the photocells will be a constant voltage when the image of the boundary intersects the axis of revolution of the photocells. In this case therefore a conventional type of safety relay cannot be used since the filter circuit does not accept any signals in this scanning condition.

A deviation of the image of the boundary from the axis of the revolution of the photocells, if these photocells are scanning at 50 cycles per second, introduces into the sum of their outputs a 100 cycles per second component. The phase of the 100 cycles per second component depends on the sense of the deviation and with a filter circuit accepting signals of this frequency can be used to control a motor for steering the carriage in known manner.

As a further alternative an oscillating scanning head of the known magnetic type producing a linear scan may be used. In such an arrangement either the photocells or a light redirecting member such as a mirror may be mounted on the oscillating part of the electromagnetic system.

It will be understood that the particular circuitry and arrangements described above are given by way of example only and that the invention may be performed using different circuits, for example to provide the combined photocell voltage, and other scanning mechanisms.

I claim:

1. A boundary follower adapted to follow a boundary between two areas which appear on a record and which absorb light differently, comprising a light source for illuminating an area of the record, two light-sensitive devices mounted a fixed distance apart, a focussing device for focussing an image of the illuminated area onto the light-sensitive devices, each light-sensitive device being arranged to provide an output signal representative of the light transmitted thereto, means for causing the light-sensitive devices and the said image to oscillate in relation to one another in such manner that the light-sensitive devices repeatedly cross a scanning axis, fixed in relation to the said image, the light-sensitive devices moving from one particular side of the scanning axis to the other side at different instants of time, a control device in which the said output signals are combined, and a steering device serving in response to the combined output signal to steer the follower relative to the illuminated area so as to cause the scanning axis to coincide with the said boundary.

2. A boundary follower as claimed in claim 1, wherein the means for causing the light-sensitive devices and the said image to oscillate in relation to one another is arranged to cause a linear movement of the light-sensitive devices transversely of the scanning axis.

3. A boundary follower as claimed in claim 2, wherein the relative movement between the light-sensitive devices and the said image is such that the light-sensitive devices oscillate between a position in which they are both disposed just to one side of the scanning axis and a position in which they are both disposed just to the opposite side of the scanning axis.

4. A boundary follower as claimed in claim 1, wherein the means for causing the light-sensitive devices and the said image to oscillate in relation to one another is arranged to cause a circular movement of the light-sensitive devices in relation to a point on the scanning axis.

5. A boundary follower as claimed in claim 4, wherein the circular movement is such that each light-sensitive device just crosses the scanning axis during the oscillations.

6. A boundary follower as claimed in claim 1, and including means for preventing an output signal from one of the light-sensitive devices from being fed to the control device; whereby the boundary follower may be adapted to follow a line in response to an output signal derived from the other light-sensitive device.

References Cited

UNITED STATES PATENTS 3,069,550   12/1962   Neander   250—202
3,209,152   9/1965   Brouwer   250—202

RALPH G. NILSON, *Primary Examiner.*

MARTIN ABRAMSON, *Assistant Examiner.*